United States Patent
Namba et al.

(10) Patent No.: US 12,226,676 B2
(45) Date of Patent: Feb. 18, 2025

(54) RESIN COMPOSITION FOR GOLF BALL, AND GOLF BALL

(71) Applicant: Bridgestone Sports Co., Ltd., Tokyo (JP)

(72) Inventors: Atsushi Namba, Saitamaken (JP); Shuto Fukasawa, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 18/102,113

(22) Filed: Jan. 27, 2023

(65) Prior Publication Data
US 2023/0211210 A1    Jul. 6, 2023

Related U.S. Application Data

(63) Continuation-in-part of application No. 17/341,639, filed on Jun. 8, 2021, now Pat. No. 11,608,434.

(30) Foreign Application Priority Data

Jun. 26, 2020   (JP) .................. 2020-110580

(51) Int. Cl.
A63B 37/06     (2006.01)
A63B 37/00     (2006.01)
C08L 47/00     (2006.01)
C08L 67/02     (2006.01)

(52) U.S. Cl.
CPC ......... *A63B 37/0024* (2013.01); *C08L 47/00* (2013.01); *C08L 67/02* (2013.01); *A63B 37/0074* (2013.01); *A63B 37/0076* (2013.01)

(58) Field of Classification Search
CPC ............ A63B 37/0024; A63B 37/0022; A63B 37/0023
See application file for complete search history.

(56) References Cited

U.S. PATENT DOCUMENTS

| 4,337,947 A | 7/1982 | Saito et al. |
| 6,217,985 B1 * | 4/2001 | Hirukawa ............... A63B 45/02 473/371 |
| 2002/0052254 A1 | 5/2002 | Ichikawa et al. |

FOREIGN PATENT DOCUMENTS

| JP | 56-083367 A | 7/1981 |
| JP | 60-060867 A | 4/1985 |
| JP | 2001-514561 A | 9/2001 |
| JP | 2002-143345 A | 5/2002 |
| WO | 98/40127 A1 | 9/1998 |

* cited by examiner

*Primary Examiner* — Raeann Gorden
(74) *Attorney, Agent, or Firm* — Sughrue Mion, PLLC

(57) ABSTRACT

The present invention provides a golf ball comprising a core of one or more layers and a cover of one or more layers which encases the core, wherein at least one layer of the cover is formed of the resin composition comprising (a') a polyester resin and (b) an amine-containing polymer having a branched structure. In the golf ball of the present invention, the adhesion property between the core and each cover layer adjacent to the core can be improved and the excellent durability can be obtained.

16 Claims, 1 Drawing Sheet

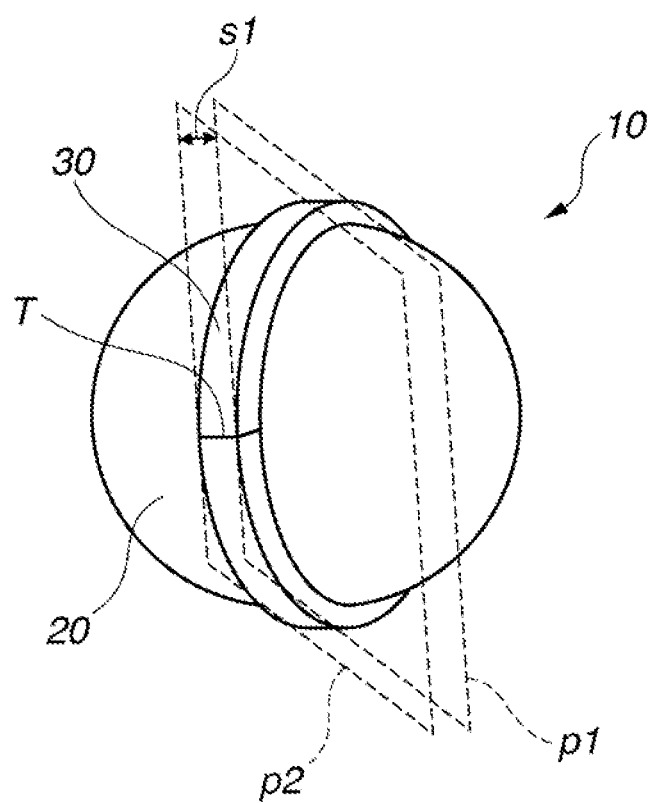

RESIN COMPOSITION FOR GOLF BALL, AND GOLF BALL

CROSS-REFERENCE TO RELATED APPLICATION

This application is a continuation-in-part of copending application Ser. No. 17/341,639 filed on Jun. 8, 2021, the entire contents of which are hereby incorporated by reference, claiming priority based on Japanese Patent Application No. 2020-110580 filed in Japan on Jun. 26, 2020.

BACKGROUND OF THE INVENTION

The present invention relates to a golf ball in which the adhesion property between the core and each cover layer adjacent to the core can be improved and the excellent durability can be obtained.

In a golf ball having a core and a cover, the cover material—as the term implies—serves to protect the core material. Ethylene/acid copolymers, or ones neutralized with metal ions, are most often used as the cover material. The reason is that these ethylene/acid copolymers and metal salts thereof are tough and have an excellent rebound resilience. The physical properties of ethylene/acid copolymers and metal salts thereof are determined by such factors as the acid content, the type of metal ion that neutralizes the acid and the degree of neutralization. Generally, when the acid content increases, the ethylene/acid copolymer or metal salt thereof becomes hard and has a high rigidity. On the other hand, when the degree of neutralization increases, the ethylene/acid copolymer or metal salt thereof has a higher rebound resilience. This effect is especially pronounced in resins having a backbone composed of three constituents: ethylene, an acid and an ester.

However, there are certain drawbacks to the use of a copolymer or metal ion-neutralized material made up of three constituents—ethylene, an acid and an ester—as the cover material in a golf ball: namely, the durability to repeated impact and the scuff resistance of the golf ball worsen.

Numerous methods to modify the properties of ethylene/acid copolymers and metal salts thereof have been attempted, many of which involve blending a rubber, elastomer or hard polymer in the ethylene/acid copolymer or metal salt thereof. However, the properties such as distance, spin rate on approach shots and durability that are desired in a golf ball do not all improve as a result.

JP-A S60-60867 and JP-A 2001-514561 describe various art that blends in a hard polymer such as a polyamide or a crystalline polymer so as to impart rigidity to an ethylene/acid copolymer or a metal salt thereof. Also, JP-A 2002-143345 and JP-A S56-083367 describe a variety of art that blends in an elastomer such as a polyester elastomer, styrene elastomer, polyamide elastomer or polyurethane elastomer for the purpose of imparting toughness to an ethylene/acid copolymer or metal salt thereof or merely for modification to a soft tactile feel.

However, golf balls in which the foregoing prior-art materials are used as the cover material often give rise to a decline in the rebound resilience, and so there remains room for improvement.

It is therefore one object of the present invention to provide a golf ball having an excellent rebound resilience and also conferring an outstanding durability to repeated impact and an outstanding scuff resistance.

It is also another object of the present invention to provide a golf ball in which the adhesion property between the core and each cover layer adjacent to the core can be improved and the excellent durability can be obtained.

As a result of extensive investigations, the present inventors have discovered that when a resin composition which includes both a polyester resin as a chief component and an amine-containing polymer having a branched structure such as polyethyleneimine is employed in a golf ball member, the adhesion property between the core and each cover layer adjacent to the core can be improved and an excellent durability to cracking can be obtained.

Accordingly, the invention provides the following golf balls.

1. A golf ball comprising a core of one or more layers and a cover of one or more layers which encases the core, wherein at least one layer of the cover is formed of the resin composition comprising:
   (a) a polyester resin, and
   (b) an amine-containing polymer having a branched structure.
2. The golf ball of the above 1, wherein the amine-containing polymer having a branched structure (b) is polyethyleneimine.
3. The golf ball of the above 1, wherein the content of component (b) is from 0.1 to 10 parts by weight per 100 parts by weights of component (a').

Advantageous Effects of the Invention

According to the golf ball of the present invention, the adhesion property between the core and each cover layer adjacent to the core can be improved and the excellent durability can be obtained.

BRIEF DESCRIPTION OF THE DIAGRAMS

FIG. 1 is a diagram showing a test specimen used for measuring the adhesion strength between a core and an envelope layer of a golf ball.

DESCRIPTION OF THE PREFERRED EMBODIMENTS

The objects, features and advantages of the invention will become more apparent from the following detailed description.

In the golf ball of the present invention which comprises a core of one or more layers and a cover of one or more layers, it is characterized that at least one layer of the cover is formed of the specific resin composition. The specific resin composition chiefly comprises (a) a polyester resin. The detailed explanation of component (a') is below.

(a') Polyester Resin

Thermoplastic polyester resin serving as component (a) is, although particularly not limited, as the illustrative examples, commercial products including Hytrel® series from DuPont-Toray Co. Ltd. such as 3046, G3548L, 4047, 4767, 5557, 6347, 7247, 2571, 2751), and Pelprene® series from TOYOBO Co., Ltd such as P-30B, P-40B, P-40H, P-55B, P-70B, P-90B, P-150B, P-280B, E-450B, P-75M, P-150M, S-1001, S-2001, S-3001, S-6001, S-9001), and Primalloy® series from Mitsubishi Chemical Corporation such as A1400, A1500, A1600, A1700, A1800, A1900. Especially, a thermoplastic polyester elastomer is preferably used.

The thermoplastic polyester elastomer serving as component is a resin composition made up of (a-1) a polyester block copolymer and (a-2) a rigid resin. Component (a-1) is made up of, in turn, (a-1-1) a high-melting crystalline polymer segment and (a-1-2) a low-melting polymer segment.

The high-melting crystalline polymer segment (a-1-1) within the polyester block copolymer serving as component (a-1) is a polyester made of one or more compound selected from the group consisting of aromatic dicarboxylic acids and ester-forming derivatives thereof and diols and ester-forming derivatives thereof.

Specific examples of the aromatic dicarboxylic acids include terephthalic acid, isophthalic acid, phthalic acid, 2,6-naphthalenedicarboxylic acid, 2,7-naphthalenedicarboxylic acid, anthracenedicarboxylic acid, diphenyl-4,4'-dicarboxylic acid, diphenoxyethanedicarboxylic acid, 4,4'-diphenyletherdicarboxylic acid, 5-sulfoisophthalic acid and sodium 3-sulfoisophthalate. In this invention, an aromatic dicarboxylic acid is primarily used. However, where necessary, a portion of this aromatic dicarboxylic acid may be substituted with an alicyclic dicarboxylic acid such as 1,4-cyclohexanedicarboxylic acid, cyclopentanedicarboxylic acid or 4,4'-dicyclohexyldicarboxylic acid or with an aliphatic dicarboxylic acid such as adipic acid, succinic acid, oxalic acid, sebacic acid, dodecanedioic acid or dimer acid. Exemplary ester-forming derivatives of dicarboxylic acids include lower alkyl esters, aryl esters, carboxylic acid esters and acid halides of the above dicarboxylic acids.

Next, a diol having a molecular weight of not more than 400 may be suitably used as the diol. Specific examples include aliphatic diols such as 1,4-butanediol, ethylene glycol, trimethylene glycol, pentamethylene glycol, hexamethylene glycol, neopentyl glycol and decamethylene glycol: alicyclic diols such as 1,1-cyclohexanedimethanol, 1,4-dicyclohexanedimethanol and tricyclodecanedimethanol; and aromatic diols such as xylylene glycol, bis(p-hydroxy)diphenyl, bis(p-hydroxy)diphenylpropane, 2,2-bis [4-(2-hydroxyethoxy)phenyl]propane, bis [4-(2-hydroxyethoxy)phenyl]sulfone, 1,1-bis [4-(2-hydroxyethoxy)phenyl] cyclohexane, 4,4-dihydroxy-p-terphenyl and 4,4'-dihydroxy-p-quaterphenyl. Exemplary ester-forming derivatives of diols include acetylated forms and alkali metal salts of the above diols.

These aromatic dicarboxylic acids, diols and derivatives thereof may be used singly or two or more may be used together.

In particular, the following may be suitably used as component (a-1-1): high-melting crystalline polymer segments composed of polybutylene terephthalate units derived from terephthalic acid and/or dimethyl terephthalate together with 1,4-butanediol; high-melting crystalline polymer segments composed of polybutylene terephthalate units derived from isophthalic acid and/or dimethyl isophthalate together with 1,4-butanediol; and copolymers of both.

The low-melting polymer segment serving as component (a-1-2) is an aliphatic polyether and/or an aliphatic polyester.

Examples of aliphatic polyethers include poly(ethylene oxide) glycol, poly(propylene oxide) glycol, poly(tetramethylene oxide) glycol, poly(hexamethylene oxide) glycol, copolymers of ethylene oxide and propylene oxide, ethylene oxide addition polymers of poly(propylene oxide) glycol, and copolymer glycols of ethylene oxide and tetrahydrofuran. Examples of aliphatic polyesters include poly($\varepsilon$-caprolactone), polyenantholactone, polycaprolactone, poly butylene adipate and polyethylene adipate. In this invention, from the standpoint of the elastic properties, suitable use can be made of poly(tetramethylene oxide) glycol, ethylene oxide adducts of poly(propylene oxide) glycol, copolymer glycols of ethylene oxide and tetrahydrofuran, poly($\varepsilon$-caprolactone), polybutylene adipate and polyethylene adipate. Of these, the use of, in particular, poly(tetramethylene oxide) glycol, ethylene oxide adducts of poly(propylene oxide) glycol and copolymer glycols of ethylene oxide and tetrahydrofuran is recommended. The number-average molecular weight of these segments in the copolymerized state is preferably from about 300 to about 6,000.

Component (a-1) can be produced by a known method. Specifically, use can be made of, for example, the method of carrying out a transesterification reaction on a lower alcohol diester of a dicarboxylic acid, an excess amount of a low-molecular-weight glycol and a low-melting polymer segment component in the presence of a catalyst and polycondensing the resulting reaction product, or the method of carrying out an esterification reaction on a dicarboxylic acid, an excess amount of glycol and a low-melting polymer segment component in the presence of a catalyst and polycondensing the resulting reaction product.

The proportion of component (a-1) accounted for by component (a-1-2) is from 30 to 60 wt %. The preferred lower limit in this case can be set to 35 wt % or more, and the preferred upper limit can be set to 55 wt % or less. When the proportion of component (a-1-2) is too low, the impact resistance (especially at low temperatures) and the compatibility may be inadequate. On the other hand, when the proportion of component (a-1-2) is too high, the rigidity of the resin composition (and the molded body) may be inadequate.

The rigid resin serving as component (a-2) is not particularly limited. For example, one or more selected from the group consisting of polycarbonates, acrylic resins, styrene resins such as ABS resins and polystyrenes, polyester resins, polyamide resins, polyvinyl chlorides and modified polyphenylene ethers may be used. In this invention, from the standpoint of compatibility, a polyester resin may be preferably used. More preferably, the use of poly butylene terephthalate and/or polybutylene naphthalate is recommended.

Component (a-1) and component (a-2) are blended in a weight ratio, expressed as (a-1):(a-2), which is not particularly limited, although this ratio is preferably set to from 50:50 to 90:10, and more preferably from 55:45 to 80:20. When the proportion of component (a-1) is too low, the low-temperature impact resistance may be inadequate. On the other hand, when the proportion of (a-1) is too high, the rigidity of the composition (and the molded body), as well as the molding processability, may be inadequate.

A commercial product may be used as this thermoplastic polyester elastomer (a). Specific examples include those available as Hytrel® from DuPont-Toray Co. Ltd.

Component (a) has a material hardness on the Shore D hardness scale which is preferably not more than 45, more preferably not more than 43, and even more preferably not more than 41. The lower limit is a Shore D hardness of preferably at least 36, and more preferably at least 38.

Component (a) has a rebound resilience which is preferably not more than 74%, more preferably not more than 73%, and even more preferably not more than 72%, The lower limit is preferably at least 50% or more, more preferably at least 52% or more, and even more preferably at least 60% or more. The rebound resilience is measured in accordance with JIS-K 6255:2013.

Component (a) has a melt viscosity of not more than $1.5 \times 10^4$ dPa·s, preferably not more than $1.45 \times 10^4$ dPa·s, more preferably not more than $1.0 \times 10^4$ dPa·s, and further more preferably not more than $0.8 \times 10^4$ dPa·s, The lower limit value is at least $0.4 \times 10^4$ dPa·s, and more preferably at least $0.5 \times 10^4$ dPa·s. With this melt viscosity, hardenability after molding of the resin composition is imparted and good moldability (productivity) can be maintained. This melt viscosity is a value measured with a Capilograph at a temperature of 200° C. and a shear rate of 243 $sec^{-1}$ in accordance with ISO 11443:1995.

Next, component (b) is an amine-containing polymer which has a branched structure. Component (b) is not a completely linear polymer: rather, it is a polymer that has a branched structure and includes on the molecule a primary, secondary or tertiary amine. For this reason, component (b) has a high cation density and good reactivity, and so it reacts with the unneutralized acid constituent in component (a). The microstructure of an ethylene and acid-containing copolymer or a metal salt thereof is generally determined by the acid content, the type of metal ions that neutralize the acid and the degree of neutralization. By blending it with an amine-containing polymer having a branched structure, such as polyethyleneimine, a resin composition can be obtained that has distinctive mechanical properties which are difficult to achieve in acid-containing copolymers alone or in the blends of acid-containing copolymers with polyamides and the blends of acid-containing copolymers with polyethylene that have hitherto been described in the art.

Component (b) is an amine-type polymer such as polyethyleneimine. The polyethyleneimine is preferably one having a high amine value, with the amine value being preferably from 18 to 21. The amine value is expressed as the number of millimoles of amine included per gram of polyethyleneimine solids.

The content of component (b) per 100 parts by weight of component (a) is preferably at least 0.01 part by weight, and more preferably at least 0.1 part by weight. The upper limit is preferably not more than 10 parts by weight, and more preferably not more than 8 parts by weight. When the component (b) content is too small, the desired effects cannot be obtained. On the other hand, when it is too large, the compatibility with component (a') may worsen and the desired effects may not be obtained, or resin scorching will occur during processing and processing will not be possible.

The compounding proportion of the total of component (a') and component (b) in the whole amount, 100 weight by % of the above resin composition is preferably at least 60 weight by %, more preferably 70 weight by % and even more preferably at least 80 weight by %.

Various additives may be optionally included in the resin composition of the invention. For example, pigments, dispersants, antioxidants, light stabilizers, ultraviolet absorbers and internal mold release agents may be suitably included.

The resin composition of the invention can be obtained by mixing together the above ingredients using any of various types of mixers, such as a kneading-type single-screw or twin-screw extruder, a Banbury mixer or a kneader.

The rebound resilience of the above resin composition is preferably not more than 68% and more preferably not more than 65%. The lower limit is preferably 47% or more and more preferably 52% or more. The rebound resilience is measured in accordance with JIS-K 6255:2013.

The material hardness on the Shore D hardness of the above resin composition is preferably not more than 48, and more preferably not more than 43. The lower limit is a Shore D hardness of preferably at least 34, and more preferably at least 39.

The resin composition for golf balls of the invention can be used as at least one layer of the cover layers (envelope layer, intermediate layer and outermost layer), particularly in two-piece solid golf balls composed of a core and a cover encasing the core, or in multi-piece solid golf balls having a core of at least one layer and a multilayer cover The constituent members of other than the above composition in the golf ball of the invention are described below.

The core can be formed using a known rubber material as the base. A known rubber such as natural rubber or a synthetic rubber may be used as the base rubber. More specifically, the use of primarily polybutadiene, especially cis-1,4-polybutadiene having a cis structure content of at least 40%, is recommended. Where desired, natural rubber, polyisoprene rubber, styrene-butadiene rubber or the like may be used together with the foregoing polybutadiene in the base rubber.

The poly butadiene used may be one synthesized with a rare-earth catalyst such as a neodymium catalyst or with a metal catalyst such as a cobalt catalyst or nickel catalyst.

Co-crosslinking agents such as unsaturated carboxylic acids and metal salts thereof, inorganic fillers such as zinc oxide, barium sulfate and calcium carbonate, and organic peroxides such as dicumyl peroxide and 1,1-bis(t-butylperoxy)cyclohexane may be included in the base rubber. Where necessary, commercial antioxidants and the like may also be suitably added.

The core diameter is suitably selected according to the ball structure. Although not particularly limited, the core diameter is preferably at least 20 mm, more preferably at least 25 mm, and even more preferably at least 30 mm. The upper limit is preferably not more than 41 mm, and more preferably not more than 40 mm.

An intermediate layer and/or an envelope layer may be provided between the core and the cover outermost layer. In this case, the intermediate layer or the envelope layer has a material hardness on the Shore D hardness scale which, although not particularly limited, may be set to typically at least 35, preferably at least 38, and more preferably at least 40. The material hardness is preferably not more than 70, and more preferably not more than 65.

The outermost layer of the cover has a thickness which, although not particularly limited, is preferably at least 0.3 mm, more preferably at least 0.4 mm, and even more preferably at least 0.5 mm. The thickness is preferably not more than 1.2 mm, more preferably not more than 1.0 mm, and even more preferably not more than 0.8 mm.

Numerous dimples of one or more type may be formed on the surface of the cover. Also, various types of coatings may be applied to the cover surface. Because the coating must be capable of enduring the harsh conditions of golf ball use, a two-part curable urethane coating, especially a non-yellowing urethane coating, is preferred.

EXAMPLES

The following Examples and Comparative Examples are provided to illustrate the invention, and are not intended to limit the scope thereof.

Examples 1 to 3, Comparative Example 1

Solid cores having a diameter of 35.2 mm were produced by using the rubber composition common in all examples shown in Table 1 and vulcanizing at 158° C. for 20 minutes.

TABLE 1

| Core (Rubber Composition) formulation | Amounts in pbw |
|---|---|
| Polybutadiene A | 20 |
| Polybutadiene B | 80 |
| Zinc acrylate | 37.0 |
| Organic peroxide | 1.0 |
| Water | 0.8 |
| Antioxidant | 0.1 |
| Zinc oxide | 22.2 |
| Zinc salt of pentachlorothiophenol | 1.0 |

Details on the above core materials are given below.
Polybutadiene A: Available under the trade name "BR51" from JSR Corporation.
Polybutadiene B: Available under the trade name "BR730" from JSR Corporation.
Zinc acrylate: Available under the trade name "ZN-DA85S" from Nippon Shokubai Co., Ltd.
Organic peroxide: Dicumyl peroxide, available as "Percumyl® D" from NOF Corporation
Antioxidant: Available under the trade name "Nocrac NS6" from Ouchi Shinko Chemical Industry Co., Ltd.
Zinc oxide: Available as "Zinc Oxide Grade 3" from Sakai Chemical Co., Ltd.
Zinc salt of pentachlorothiophenol:
  Available from Wako Pure Chemical Industries, Ltd.
Formation of Cover Layer (Envelope Layer)
Next, the resin compositions shown in Table 2 below were injection-molded over the core obtained above, thereby producing a sphere encased by an envelope layer having a thickness of 1.2 mm (envelope layer-encased sphere).

TABLE 2

| | | Comparative Example 1 | Example 1 | Example 2 | Example 3 |
|---|---|---|---|---|---|
| Envelope layer (Formulation: pbw) | Polyester resin | 100 | 100 | 100 | 100 |
| | Polyethyleneimine: | — | 0.25 | 1.00 | 1.50 |
| Resin property | Shore D hardness | 40.3 | 40.1 | 39.8 | 39.7 |
| | Adhesion (N) | 4.276 | 7.023 | 5.329 | 6.139 |

Details on the compounding ingredients in the table are given below.
Polyester resin: Hytrel® 4001 from DuPont-Toray Co., Ltd.
Polyethyleneimine: "Epomin™ SP-012" from Nippon Shokubai Co., Ltd. (number-average molecular weight, approx. 1,200; amine value, 19)
Physical Property of Resin Material (Shore D Hardness)
The resin material is formed into 2 mm thick sheets and left to stand for at least 2 weeks. After that, the material hardness of the resin is measured using a Shore D durometer in accordance with ASTM D2240-95.
The adhesion property of the envelope layer-encased sphere of each of Examples 1-3 and Comparative Example 1 obtained as described above is evaluated by the following method. The results are shown in Table 2.
Adhesion Property
Referring to FIG. 1, letting p1 be a plane at a distance of 2 mm from the center of an envelope layer-encased sphere 10 and p2 be a plane having point symmetry with p1 through the ball center, the adhesion strength between the envelope layer 30 and the core 20 was measured in the ball region s1 between the two planes p1 and p2. First, cuts T were made in the envelope layer 30 where p1 and p2 respectively intersect the envelope 30, and those portions of the envelope layer 30 other than s1 were peeled off. Next, a cut T perpendicular to p1 and p2 was made in the envelope layer 30 and, starting at this cut, about 20 mm of the envelope layer 30 was peeled from the core 20, thereby obtaining a test specimen having a partially peeled strip thereon for gripping. The test was then carried out by gripping the strip provided in the envelope layer 30 with the movable clamp of a tensile tester. A test specimen-immobilizing fixture allows the test specimen to rotate while maintaining its center position, enabling the envelope layer 30 wrapped around the core 20 to be peeled off without slack as the clamp moves away. Based on JIS K6256 ("Adhesion Test Method for Vulcanized Rubber and Thermoplastic Rubber"), the movable clamp of the tensile tester was moved at a speed of 50 mm/min and the tensile strength was measured at 0.1 mm intervals. The tensile strengths over an approximately 100 mm length of the envelope layer 30 were measured for each of three test specimens, and the average of the measured values for the three specimens was treated as the adhesion strength (units: N).

As seen from the results of Table 2, Examples 1-3 are superior to Comparative Example 1 in an adhesion property between the core and the envelope layer, the resulting which the durability of the golf ball is improved.

The invention claimed is:

1. A golf ball comprising a core of one or more layers and a cover of one or more layers which encases the core, wherein at least one layer of the cover is formed of the resin composition comprising:
   (a') a polyester resin, and
   (b) an amine-containing polymer having a branched structure,
   wherein the compounding proportion of the total of component (a') and component (b) in the whole amount, 100 weight by % of the resin composition is at least 60% by weight.

2. The golf ball of claim 1, wherein the amine-containing polymer having a branched structure (b) is polyethyleneimine.

3. The golf ball of claim 1, wherein the content of component (b) is from 0.1 to 10 parts by weight per 100 parts by weights of component (a').

4. The golf ball of claim 1, wherein the resin composition does not comprise a polyurethane resin.

5. The golf ball of claim 1, wherein the cover layer is adjacent to the core.

6. The golf ball of claim 1, wherein the cover has numerous dimples of one or more type on its surface.

7. The golf ball of claim 1, wherein the core comprises a base rubber.

8. The golf ball of claim 1, wherein the rebound resilience of the resin composition is from 47 to 68%.

9. The golf ball of claim 1, wherein the material hardness on the Shore D hardness of the resin composition is from 34 to 48.

10. A golf ball comprising a core of one or more layers and a cover of one or more layers which encases the core, wherein at least one layer of the cover is formed of the resin composition comprising:
   (a') a polyester resin, and
   (b) an amine-containing polymer having a branched structure,
   wherein the rebound resilience of the resin composition is from 47 to 68%.

11. The golf ball of claim 10, wherein the amine-containing polymer having a branched structure (b) is polyethyleneimine.

12. The golf ball of claim 10, wherein the content of component (b) is from 0.1 to 10 parts by weight per 100 parts by weights of component (a').

13. The golf ball of claim 10, wherein the material hardness on the Shore D hardness of the resin composition is from 34 to 48.

14. A golf ball comprising a core of one or more layers and a cover of one or more layers which encases the core, wherein at least one layer of the cover is formed of the resin composition comprising:
   (a') a polyester resin, and
   (b) an amine-containing polymer having a branched structure,
   wherein the material hardness on the Shore D hardness of the resin composition is from 34 to 48.

15. The golf ball of claim 14, wherein the amine-containing polymer having a branched structure (b) is polyethyleneimine.

16. The golf ball of claim 14, wherein the content of component (b) is from 0.1 to 10 parts by weight per 100 parts by weights of component (a').

\* \* \* \* \*